Nov. 29, 1960 M. A. BIRD 2,962,038
PRESSURE RELIEF ASSEMBLY
Filed May 1, 1958
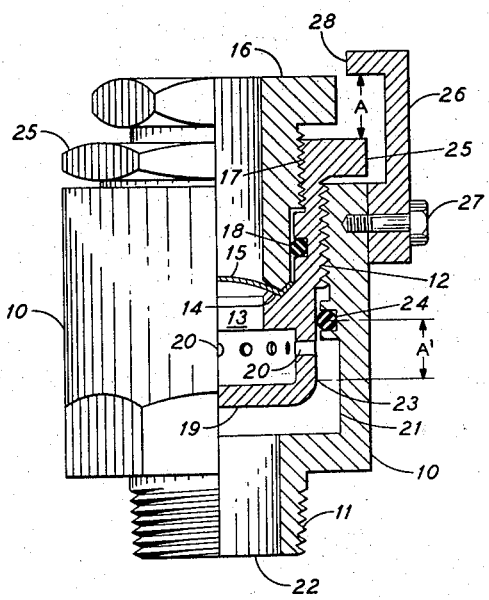
INVENTOR
MILO A. BIRD
BY Frank E. Johnston
Walter G. Miller
ATTORNEYS

United States Patent Office 2,962,038
Patented Nov. 29, 1960

2,962,038
PRESSURE RELIEF ASSEMBLY

Milo A. Bird, San Rafael, Calif., assignor to California Research Corporation, San Francisco, Calif., a corporation of Delaware Filed May 1, 1958, Ser. No. 732,218
1 Claim. (Cl. 137—68)

This invention relates to a pressure relief assembly including a rupturable disc, and particularly refers to an arrangement for holding the disc in a movable cup having one or more ports in its side wall, the cup being selectively positioned in a sealed passage so that, after a disc has ruptured, it may be replaced without loss or escape of fluid from the system it is intended to protect.

In the protection of fluid-containing systems subject to conditions where pressures may exceed a predetermined value, it has been the practice to provide a pair of clamping means for holding a thin metal disc, called a rupture disc or bursting disc, across a passage leading to the atmosphere. The material, thickness, and shape of the disc determines the pressure in the system at which the disc will fail and release some of the fluid in the system to the atmosphere to reduce the pressure in the system.

There are numerous locations and circumstances where toxic, highly corrosive, inflammable, or hazardous fluids are involved, so that the removal of a ruptured disc and its replacement by a new one, whereby the system may be restored to normal operation, involves a considerable risk to personnel or, more often, requires the complete emptying and purging of the system.

This invention comprehends and has for its principal object an arrangement of parts whereby after a disc has failed, the selectively movable cup-like holder in which it is mounted may be quickly placed in a condition to shut off the normal communicating passage between the disc and the pressure system so that no more fluid may escape therefrom and a new disc may be safely and quickly installed. Thereafter the holder may be restored to its operative condition, which admits the pressure fluid to the space below the disc. It also comprehends a readily observable indicating means, to inform the operator whether or not the holder and disc are in their proper position to protect the system against excess pressure.

These and other objects and advantages of the invention will be further apparent from the following description of a preferred embodiment, taken in connection with the attached drawing.

In the drawing, the single figure represents a vertical longitudinal and part sectional view, showing the several parts in condition for normal operation of the unit as a pressure relief assembly.

Reference numeral 10 designates a generally cylindrical hollow body having a bore terminating at its lower end in a threaded lower extension 11 for attachment to the pressure vessel, piping system, or the like, which is to be protected against excess pressure. The upper end of the bore of body 10 is internally threaded at 12 to receive an externally threaded cup-shaped member generally designated 13 having an inwardly projecting annular seat 14 on which the rupture or bursting disc 15, generally of thin metal, is adapted to rest. The material and thickness of disc 15 is chosen to suit the operating conditions, corrosivity of the fluid handled, etc., and needs no further description here. A hollow bushing 16 is externally threaded throughout part of its length, to be received at 17 in cup 13, and has an appropriately shaped beveled lower end to clamp the rim of disc 15 to seat 14 in fluid-tight relation. Desirably, but not necessarily, an O-ring 18 may be provided to seal bushing 16 in cup 13.

Above the lower or closed end 19 of cup 13 and below seat 14, there is, in this example, a single circumferentially spaced row of ports 20, which normally provide fluid communication between the inside of cup 13 and an annular space 21 in housing 10, which in turn communicates at all times with the inlet bore 22 in the threaded extension 11. Cup 13 has a smoothly finished cylindrical outer face 23 on the side wall portion that joins the threaded part 12 to the bottom closure 19, and this face extends both upwardly and downwardly from the circumferential row of ports 20, as shown. Within the bore of body 10, above the annular space 21, there is provided a recess or groove for a resilient O-ring 24 of material appropriate to the service, which will cooperate with outer face 23 of cup 13 to form a fluid-tight seal.

In the position shown in the drawing, it will be noted that the seal just described is above the row of ports 20, due to the fact that cup 13 is screwed into housing 10 until the bottom of hexagon head 25 of cup 13 is substantially in contact with the top face of the housing. This positions the ports 20 to establish fluid communication between the annular space 21 in the housing and the interior of cup 13 below disc 15.

Thus the fluid pressure in the system to which the assembly is attached will be exerted beneath disc 15, and, if it builds up to a predetermined value, will rupture the disc, and vent the system to the atmosphere through the bore of bushing 16. When this occurs, the cup 13 carrying the ruptured disc and its securing bushing may be rotated by means engaging hexagonal head 25 until the cup has been moved out of housing 10 to a distance that will place O-ring 24 below the row of ports 20, or substantially at the point on outer surface 23 where the lead line from that reference numeral terminates. To prevent complete or inadvertent removal of cup 13 from housing 10, a stop member generally designated 26 is secured to the outer face of housing 10, as by a pair of circumferentially spaced cap screws 27. At its upper end member 26 has an inwardly directed lug 28 which overlaps the hexagon head 25 of cup 13 in all positions of the latter.

In the position just described, the sealing ring 24 engages the outer face 23 of cup 13 below ports 20, between those ports and the bottom 19 of the cup, thus sealing off the fluid in inlet 22 and annular space 21 from the space inside of cup 13. The escape of fluid from the system is thus stopped, so that the ruptured disc 15 may be replaced by screwing out bushing 16, inserting a new disc and clamping it in place by screwing the bushing back into place. Rotation of cup 13 in the opposite direction by head 25 will replace the assembly in the operative position shown.

The spacing of lug 28 at a distance "A" above the top of head 25 when the latter is in its lowermost position desirably corresponds to the distance A' which represents the extreme positions of the O-ring with respect to the outer face of the straight cylindrical wall portion 23 of cup 13. Thus, the top of housing 10, the hexagonal head of the cup 13 and the lug 28 cooperate to indicate to the observer just what is the internal condition of the assembly.

Although a single example is illustrated and described, it is apparent that numerous modifications and changes could be made without departing from the essential features of the invention as set forth in the following claim, and all such variations are intended to be embraced thereby.

I claim:

A pressure relief assembly adapted to receive a rupturable disc while said assembly is under pressure, comprising a housing having a longitudinal bore, an inlet for said bore, a single annular sealing means in said housing intermediate the length of said bore, an outwardly open internally threaded cup having a cylindrical side wall and movable longitudinally in said bore, an annular abutment inside of said cup, at least one port in said side wall between said abutment and the closed end of said cup, a threaded hollow bushing for securing a rupturable disc to said abutment to close the open end of said cup, and threaded means for selectively securing said cup in the bore of said housing, so constructed and arranged that when said cup is moved inwardly and said port is below said sealing means the inlet of said housing is in fluid communication with said cup below said disc, and when said cup is moved outwardly in said bore said port is above said sealing means and the inlet of said housing is sealed from the interior of said cup whereby said bushing may be removed and said rupturable disc replaced while the interior of said bore is subject to operating pressure without removal of said assembly from a pressure system.

References Cited in the file of this patent

UNITED STATES PATENTS

| | | |
|---|---|---|
| 25,853 | Stickney | Oct. 18, 1858 |
| 1,478,584 | Schweinert | Dec. 25, 1923 |
| 2,370,870 | McKeague | Mar. 6, 1945 |

FOREIGN PATENTS

| | | |
|---|---|---|
| 130,233 | Australia | Apr. 17, 1947 |